United States Patent [19]

Arai et al.

[11] Patent Number: 4,531,829
[45] Date of Patent: Jul. 30, 1985

[54] MULTI-FORM SLIDE SELECTION APPARATUS

[75] Inventors: Noboru Arai; Masaji Yokota; Takekazu Yanagimoto, all of Kaisei, Japan

[73] Assignee: Fuji Photo Film Co., Ltd., Kanagawa, Japan

[21] Appl. No.: 526,813

[22] Filed: Aug. 26, 1983

[30] Foreign Application Priority Data

Sep. 6, 1982 [JP] Japan .................................. 57-154876

[51] Int. Cl.³ ........................ G03B 27/52; G03B 27/70
[52] U.S. Cl. ........................................ 355/43; 355/64
[58] Field of Search ................................ 355/64, 40–45

[56] References Cited

U.S. PATENT DOCUMENTS 3,796,487  3/1974  Voorhees .......................... 355/434
3,988,063  10/1976  McNair et al. ...................... 355/40
4,134,674  1/1979  Osaki et al. ......................... 355/43
4,185,913  1/1980  Ammann et al. .................... 355/43

Primary Examiner—Richard A. Wintercorn
Attorney, Agent, or Firm—Birch, Stewart, Kolasch & Birch

[57] ABSTRACT

In a computer output microfilmer (COM) system, in which video information output from a central processing unit to appear on a display and video information recorded on one of multiple form slides are projected to a recording medium to be recorded thereon in a superimposed manner, a multi-form slide selection apparatus selects specific one of the multiple form slides. The apparatus includes provision for causing the specific form slide to move as far as the vicinity of a projection position and positioned thereat to be held accurately at the projection position.

16 Claims, 7 Drawing Figures

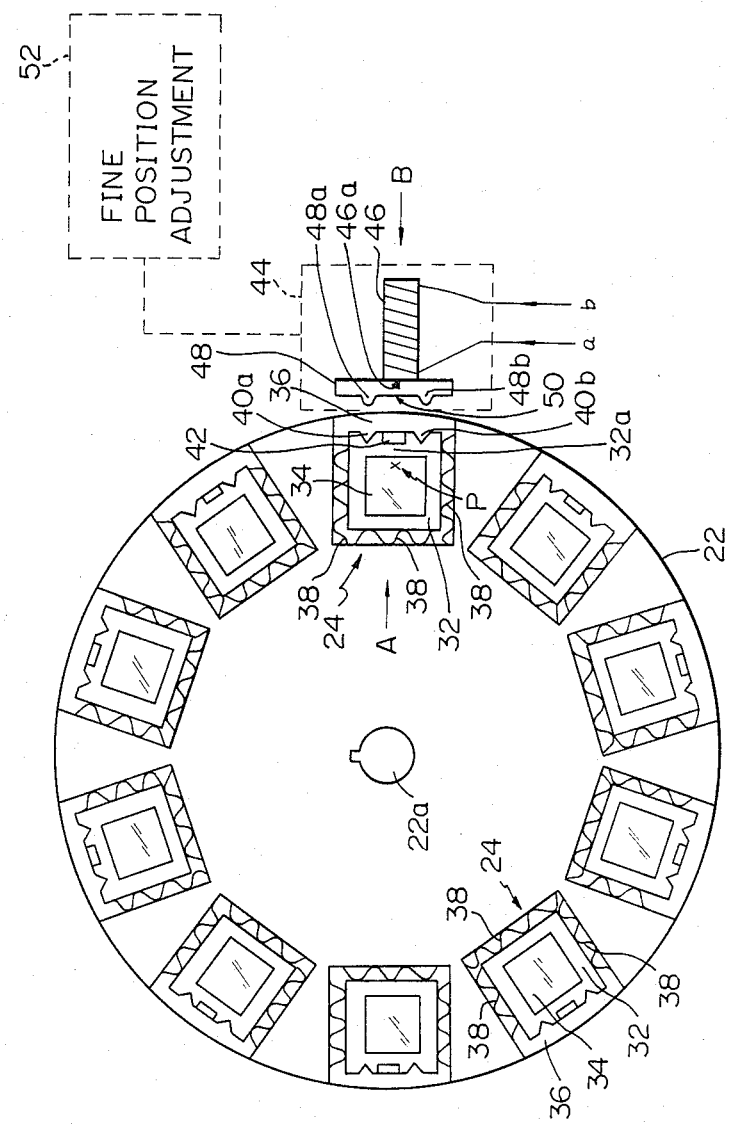

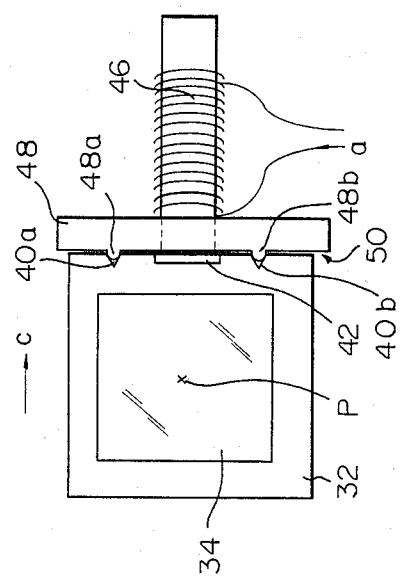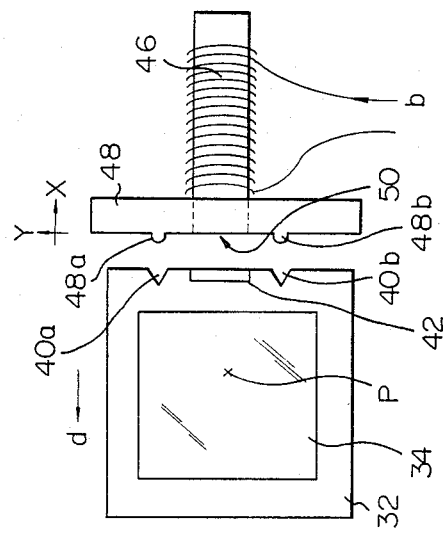
Fig. 3a
Fig. 3b

MULTI-FORM SLIDE SELECTION APPARATUS

BACKGROUND OF THE INVENTION

1. Field of the Invention

The present invention generally relates to a computer output microfilmer (COM) system and, more particularly, to a multi-form slide selection apparatus for the COM system which allows specific one of multiple form slides to be selected and then its form to be projected to a microfilm or like record medium, together with computer output video patterns which appear on such a display as a cathode ray tube (CRT).

2. Description of the Prior Art

In one prior art COM system, desired data output from a data processing system is caused to appear on a CRT or like display while, at the same time, one of multiple form slides carrying a form associated with the displayed information is selected. The displayed information and the form on the selected slide are picked up by a common imaging system to be recorded on one frame of a microfilm in a superposed manner. For example, the information displayed on the CRT may be the balances of personal bank accounts in which case a selected form is often made up of rules.

In another prior art COM system, an image pattern on a selected form slide is scanned with a laser beam to be transformed into a time serial video signal. Meanwhile, information output from a data processing system is coverted into a time serial video signal with or without the intermediary of a magnetic tape or the like. These time serial video signals are combined together to be recorded on a microfilm.

The prerequisite in the two systems described is that a form matching to a specific format of data to be recorded on the microfilm be selected out of a number of form slides in response to the content and property of computer output data.

To meet this requirement, COM systems now in use are furnished with a device for selecting a desired form, i.e., a multi-form slide selection device. One known approach to such a device is a form slide stocker which stores, for example, ten form slides stacked one upon another and is movable up and down with respect to a predetermined position. A selected form is discharged from the stocker to automatically intersect a predetermined optical axis of optics in the predetermined position. Another known approach is a straight form slide holder which has, for example, ten form slides arranged linearly thereon and is movable to locate a desired form in register with an optical axis of optics.

The problem commonly encountered with the approaches discussed above is that the time period consumed for the selection of a desired form is disproportionately long compared to the processing time of the computer system connected to the form selector. The slide selector with the stocker, for example, requires four seconds for the replacement of immediately neighboring forms and eight seconds for that of the top and bottom forms in the stack. Throughout the replacement period, recording data into the microfilm should be interrupted at the sacrifice of efficiency of the whole COM system. The slide selector with the holder is little better than the one with the stocker, consuming one second for the replacement of neighboring forms and 10 seconds for that of forms at opposite ends.

Another important consideration in the COM system is the positional accuracy which is required for recording a form on a form slide on a microfilm. Usually an image pattern on a form slide is focused by optics onto a microfilm in reduced dimensions. The prescribed resolution is not more than one pixel or dot on a microfilm, and this requires a positional accuracy of 10–60 $\mu$m at the maximum in accordance with dimensional standards of form slides. Hence, a positional accuracy of about 5 $\mu$m will usually suffice in practice. Stated another way, the accuracy of a form slide relative to the optical axis of the optics is required to be about 5 $\mu$m.

Implementations for a shorter form selection time and a higher form positional accuracy heretofore proposed include a system using a rotatable disc or a hollow, polygonal rotatable frame having a plurality of side surfaces, with a plurality of form slides carried on the disc or the frame, as disclosed in Japanese Patent Application Nos. 46522/1982 and 46519/1982, both filed by the same assignee as the present application. In these systems, a plurality of form slide carrying devices are used for accurately fixing individual form slides in advance on the disc or the polygonal frame, taking into account the relation of the form slides with a predetermined projection position. The form slide carrying devices are controlled to move into register with an optical axis and stop thereat. These systems, unlike those with a stocker or a holder, insure a positional accuracy well feasible for practical use.

The present invention constitutes a further improvement over this type of prior art multi-form slide selectors.

SUMMARY OF THE INVENTION

It is an object of the present invention to provide a multi-form slide selection apparatus which facilitates quick selection of a desired form slide, accurate positioning in the event of projection, and simple and speedy manual operation for loading a plurality of form slides on the apparatus or for replacing some of form slides on the apparatus with others.

It is another object of the present invention to provide a generally improved multi-form slide selection device.

A multi-form slide positioning device of the present invention is applicable to a multi-form slide recording system in which specific one of a plurality of form slides individually received in form-slide housing sections of form-slide carrying means is selected and information recorded in the specific slide is projected by optics onto a record medium. The device includes form slide mount means for individually mounting the form slides. The form slide mount means are individually removably received in the housing sections of the form-slide carrying means. Mount drive means shifts the form slide mount means, which has the selected specific form slide thereon, toward a projection position to be projected by the optics and then causes the mount means to move outward from the housing section associated therewith. Mount means positioning means is provided for stopping the movement of the mount means at the projection position and positioning the mount means for projection.

BRIEF DESCRIPTION OF THE DRAWINGS

The above and other objects, features and advantages of the present invention will become more apparent from the following detailed description taken with the accompanying drawings, in which:

FIG. 2 is a plan view showing an embodiment of a multi-form slide selection apparatus in accordance with the present invention;

FIG. 3a is a view of the slide selector of the present invention in a condition for projection;

FIG. 3b is a view similar to FIG. 3a but showing the slide selector in a condition after the projection;

DESCRIPTION OF THE PREFERRED EMBODIMENTS

While the multi-form slide selection apparatus of the present invention is susceptible of numerous physical embodiments, depending upon the environment and requirements of use, a substantial number of the herein shown and described embodiments have been made, tested and used, and all have performed in an eminently satisfactory manner.

Figure 1:
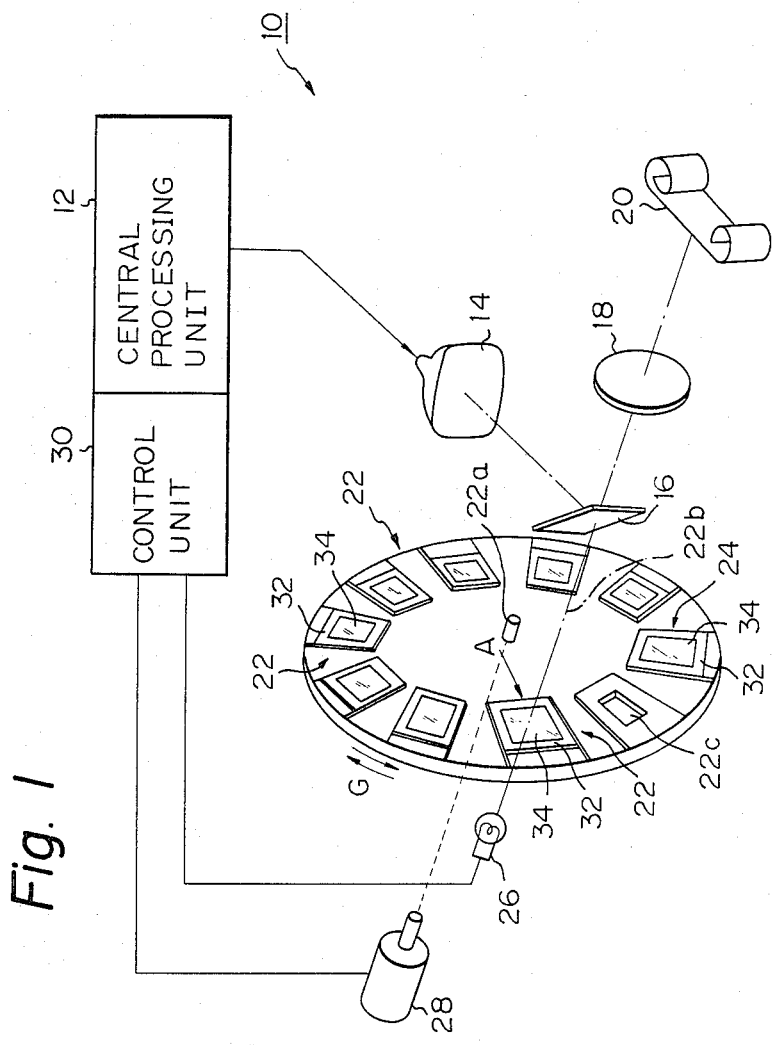
FIG. 1 is a perspective and partially diagrammatic view of a basic COM construction to which the present invention is applicable.

Referring to FIG. 1 of the drawings, a basic COM construction to which the present invention is applicable is shown and generally designated by the reference numeral 10. The COM 10 includes a central processing unit (CPU) 12 which is connected to a display 14 such as a cathode ray tube (CRT). A half-transmitting mirror 16 is located to steer light produced from the display 14 toward an adjacent lens 18. A recording medium 20 as typified by a microfilm is so positioned that the lens 18 may focus the light from the mirror 16 thereto. Located at the opposite side of the recording medium 20 with respect to the mirror 16 is a disc 22 which has a plurality of form slides 24 mounted thereon and is rotatable with a shaft 22a in either direction as indicated by arrows G. A light source 26 is positioned at the rear of the disc 22 to illuminate one of the slides 24 which will be selected in a manner later described. A stepping motor or like drive source 28 is operatively connected to the shaft 22a with or without an intermediary coupling mechanism. Controls over the light source 26, drive source 28, and the like are effected by a control unit 30.

The visual information appearing on the display 14 may be characters and/or graphics which are fed thereto from the CPU 12 to be written into the microfilm 20. Meanwhile, specific one of the slides 24 bearing a desired form associated with the information on the display 14 is selected out of all the slides 24 and, then, the stepping motor 28 is energized to rotate the disc 22 through the shaft 22a until the selected slide 24 becomes located on an optical axis 22b, which extends from the light source 26 to the microfilm 20. On energization of the light source 26, the light bearing the desired form in the slide 24 is transmitted through the mirror 16 to the lens 18. As a result, the lens 18 combines the image on the display 15 and that on the slide 24 to focus the composite image to the record surface of the microfilm 20.

As shown in FIG. 1, the disc 22 comprises a molding of resin which is formed with a plurality of windows 22c therethrough, ten windows in the illustrated configuration. The slides 24 are mounted on the disc 22 at spaced locations along the disc circumference individually in register with the windows 22c. While an adhesive may be used to permanently fix the slides 24 to the disc 22, it will be more convenient to make the individual form slides 24 removable for replacement purposes by employing L-shaped metal fittings, leaf springs or the like as will be described.

Each form slide 24 is made up of a generally rectangular mount or frame 32 to be fit in the disc 22 in register with a window 22c, and a dry plate 34 rigidly retained by the mount 32. The form recorded in the dry plate 34 may be a set of rules for tabulating the balances of personal bank accounts by way of example. In FIG. 1, the light from the light source 26 irradiates the slide 24 which is positioned on the optical axis 22b, so that the form in the slide 24 is projected through the mirror 16 and lens 18 to the microfilm 20. This allows the computer output data appearing on the display 14 to be written into the microfilm 20 together with the form recorded on the slide 24.

Referring to FIG. 2, an embodiment of a multi-form slide selection apparatus in accordance with the present invention is shown in a plan view. Here, the control arrangements, imaging device and the like which can be readily implemented by known means are not shown for simplicity.

As shown in FIG. 2, the disc 22 has a plurality of radially extending recesses or slide housing sections 36 which are distributed at predetermined spacings along the circumference of the disc. As described earlier, each slide 24 comprises the mount 32 and the dry plate 34 securely held thereinside. Yieldable retainer means such as leaf springs 38 are preloaded inside each recess 36 so that, when a slide 24 is inserted radially into the recess 36, they may be lightly pressed against the slide 24. This kind of arrangement permits any one of the slides 24 to be demounted from the disc 22 whenever desired. The radially outermost side 32a of the generally rectangular slide mount 32 is formed with at least one generally V-shaped notch, two spaced notches 40a and 40b in this specific embodiment. A permanent magnet 42 is embedded in the mount side 32a between the notches 40a and 40b such that its radially outermost surface is flush with that of the mount side 32a.

To bring desired one of the slides 24 into register with the optical axis 22b (FIG. 1), the control unit 30 responds to, for example, an address signal from the CPU 12 by driving the pulse motor 28 until the desired slide 24 reaches a predetermined stop position A. On detection of the arrival of the slide 24 at the stop position A, the control unit 30 stops driving the pulse motor 28 further. In the meantime, while the desired slide 24 is in the stop position A, the optical axis 22b intersects the slide 24 perpendicularly thereto at a position P closer to the peripheral edge of the disc 22 than to the center of the slide surface.

Therefore, means has to be provided for shifting the slide 24 to a correct position for projecting after it has been inserted into a recess 36, and securely holding the slide 24 thereat. To implement this need, positioning means 44 is located at a position B which, as shown in FIG. 2, opposes the stop position A for a specific slide 24 through the peripheral edge of the disc.

In detail, the positioning means 44 comprises an electromagnet 46 adjacent to the disc 22 and having a core with an end 46a, and a stop member 48 having a reference surface 50 which faces the disc 22. The core end 46a of the electromagnet 46 is rigidly and perpendicularly connected to a substantially intermediate portion of the other or rear surface of the stop 48, thereby forming a generally T-shaped integral structure with the stop 48. Spaced lugs 48a and 48b protrude from the reference surface 50 of the stop 48 toward the disc 22 so that they will be individually opposed by the notches 40a and 40b of a desired slide 24 held in the stop position A. The core end 46a of the electromagnet 46, on the other hand, will be opposed by the magnet 42 embedded in the slide mount 32 of the selected slide 24 which is in the stop position A.

Preferably, the stop 48 forming a part of the positioning means 44 is made of a material which is immune to magnetism, e.g. aluminum.

Referring also to FIGS. 3a and 3b, the operation of the slide selector having the above construction will be described. The slide selector is shown in FIG. 3a in an operative state for positioning the slide 24 and in FIG. 3b, in an inoperative state after the positioning operation.

In FIG. 2, the control unit 30 actuates the stepping motor 28 to bring selected one of the ten slides 24 on the disc 24 to the stop position A in accordance with a programmed sequence. Then, the control unit 30 energizes the electromagnet 46 of the positioning means 44 thereby causing a current having a polarity in a direction a shown in FIG. 3a, for example, to flow through the electromagnet coil. In a plane containing the disc 22, the resulting magnetic lines of force act on the magnet 42 in the mount 32 in a direction for attracting it to thereby move the mount 32 bodily in a direction c shown in FIG. 3a.

The mount 32, therefore, is pulled radially outwardly from the nested recess 36 in the disc 22 sliding on and along the springs 38, while the outermost mount side 32a with the magnet 42 is attracted into intimate contact with the reference surface 50 of the stop 48. It will be seen that stable position of the mount 32 is attainable only when its position in directions X and Y in FIG. 3b is precisely restricted and, therefore, only when the notches 40a and 40b of the slide are individually brought into engagement with the lugs 48a and 48b of the stop 48 in the plane which contains the disc 22.

In this manner, simply energizing the electromagnet 46 by a current of a predetermined polarity causes the selected slide 24 to be intimately engaged with and retained by the stop 48 which has the reference surface 50 adjusted in position. This facilitates an automatic procedure for accurately positioning the center of the slide surface in register with the position P of the optical axis of the optics.

While the slide 24 is accurately positioned as described above, the light source 26 is energized to project the form recorded on the slide 24. Then, the sequence proceeds to an operation for returning the slide 22 to the stop position A where it becomes nested in the recess 36 again. For this purpose, a current of a polarity b opposite to the polarity a is caused to flow through the coil of the electromagnet 46 as shown in FIG. 3b, thereby energizing the electromagnet 46 for a predetermined period of time. The resulting repulsion urges the mount 32 bodily in a direction d moving the notches 40a and 40b of the slide mount 32 away from the associated lugs 48a and 48b of the stop 48. As a result, the mount 32 is moved into the recess 36 in the stop position A, as shown in FIG. 2.

In the slide selector of the type described which uses magnetism for moving a slide 24 between the stop position A and the projection position, the displacement of the slide 24 should preferably be smaller than the length of one side of the mount 32 measured in the radial direction of the disc 22. This is because, for the quick and accurate positioning and returning actions in accordance with the present invention, it is preferable that part of the slide 24 is prevented from being fully pulled out from the recess 36 in the event of projection. In the positioning method represented by the embodiment, opposite side edges of the mount 32 are at least partly retained by the leaf springs 38 so that the mount 32 may be shifted to the projection position guided thereby in the pull-out direction. It should be noted, however, that such a method is only illustrative and may be replaced by another.

As shown in FIG. 2, the positioning means 44 is furnished with, for example, an X- and Y-direction fine adjustment mechanism 52 in order to accommodate possible variations in the position of the axis of the optics, instrumental errors due to replacement of the disc 22, variations in the size of the slides 24, etc. Details of the mechanism 52 will not be shown or described because any known mechanism is applicable thereto insofar as it is qualified for the desired function.

In the embodiment described above, the control sequence for moving a slide 24 toward and away from the projection position is designed such that a supply of current of a first polarity through the coil of the electromagnet 46 is immediately followed by a supply of current of a second polarity. This sequence design may be replaced by one which supplies a current of a first polarity a plurality of successive times and then a current of a second polarity a plurality of successive times, or one which repeatedly supplies a current a plurality of times while reversing the polarity for each of the positioning and returning actions. Thus, the slide selector of the present invention is capable of shifting a single slide toward and away from the projection position simply by selectively supplying a current through the electromagnet 46 and switching the polarity thereof. Where means other than the magnetic means is used to move the form slide 24 back into its associated recess 36 in the disc 22, it is of course needless to switch the polarity of the current through the electromagnet 46.

Figure 4:
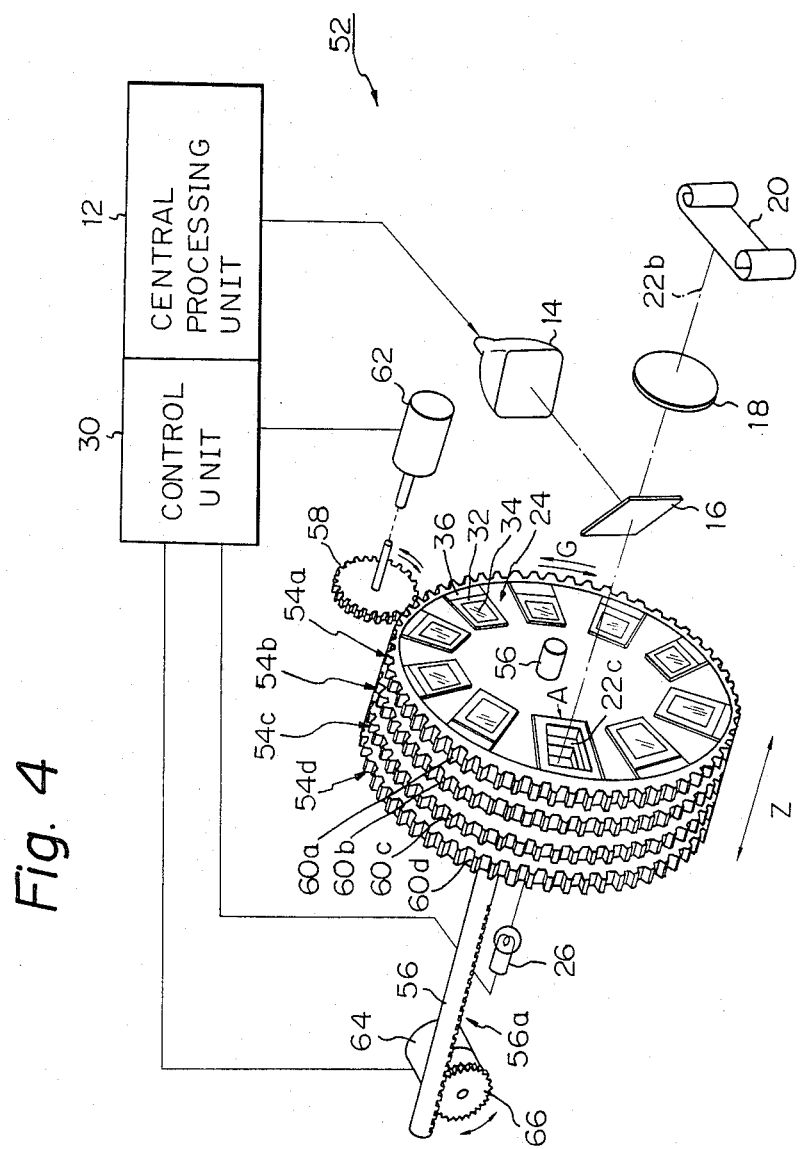
FIG. 4 is a view of another COM construction to which the present invention is applicable.

Referring to FIG. 4 another example of COM systems to which the slide selector of the present invention is applicable is illustrated. In this COM system, generally 52, the structural elements similar to those shown in FIG. 1 are designated by the same reference numerals. While the COM 10 of FIG. 1 comprises a single disc 22 which in turn limits the number of available form slides to ten per disc at most, the COM 52 of FIG. 4 is furnished with a plurality of discs, 54a–54d in the construction shown in FIG. 4. In this embodiment, each of disc 54a–54d may carry nine form slides 24 at most, with one of the ten housing sections 36 idle in order to pass freely projection beam 22b therethrough. The discs 54a–54d, unlike the disc 22, are individually rotatably mounted on a shaft 56 and formed with teeth 60a–60d thereon, respectively. The teeth 60a–60d are selectively engageable with a toothed wheel 58 which is in driven connection with a stepping motor 62, equivalent to the stepping motor 28 of the COM 10, with or without an intermediary coupling mechanism. The stepping motor 62, like the stepping motor 28, is rotated under the control of the control unit 30. With this construction, selected one of the discs 54a–54d will be rotated by the stepping motor 62 about the shaft 56 until desired one of the slides 24 carried thereon reaches the optical axis 24b, i.e. the stop position A. The remaining or unselected discs are kept in such an angular position that the windows 22c thereof, not loaded with form slide 24, involve optical axis 22b to pass the light emitted from light source 26 without interruption. To allow one of the discs 54a–54d to mesh with the toothed wheel 58, the COM 52 uses a second motor 64 which is also rotated under the control of the control unit 30. A pinion 66 such as shown in the figure is mounted on the output shaft of the motor 64 and held in constant mesh with a rack 56a formed on the shaft 56. Because the rotation of the pinion 66 causes the rack 56a into a linear reciprocal movement in a direction Z, a specific disc 54 with a desired slide is selectable by subjecting the motor 64 to the control of the control unit 30 to take the axial position at which the selected disc 54 will be meshed with the toothed wheel 58. The selected disc is in turn rotated to bring the desired slide to the stop position A under the control of the control unit 30.

Naturally the slide selector of the present invention such as shown in FIG. 2 is associated with each of the discs 54a–54d of the COM 52. A mount 32 with notches 40a and 40b and permanent magnet 42 is received in a recess 36 of each disc resiliently retained by springs 38, although they are not dipicted in FIG. 4 only for simplicity. The positioning means 44, also not shown in FIG. 4, is located in the position B which opposes the stop position A where the selected slide will be stopped. The operation of the slide selector is similar to that described with reference to FIG. 3 and, therefore, will not be discussed any further.

Figure 5:
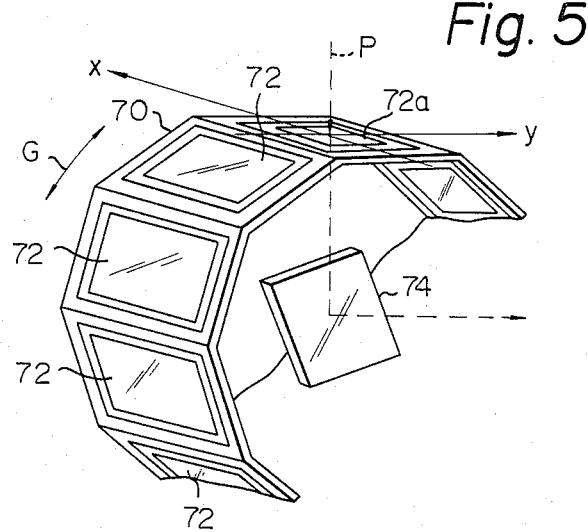
FIGS. 5 and 6 are perspective views of other COM constructions to which the present invention is applicable, particularly alternative rotatable disc configurations thereof.
Figure 6:
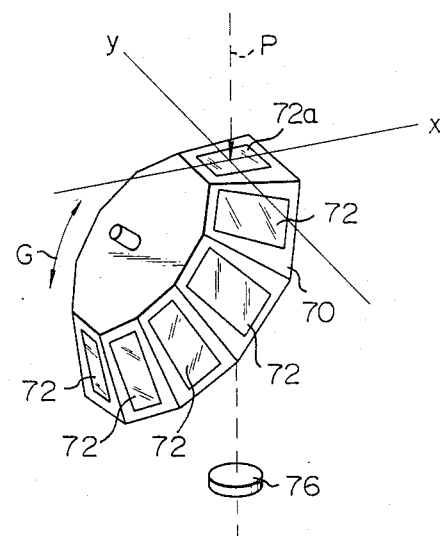

Referring to FIGS. 5 and 6, there are shown other examples of the COM system to which the present invention is applicable, particularly modifications to the disc configuration shown and described. In each of FIGS. 5 and 6, a frame member 70 has a plurality of slides 72 along its circumference. Specific one of the slides brought to the predetermined stop position is indicated by 72a. The frame 70 with the slides is rotatable as indicated by a double-headed arrow G by a driving source similar to motor 28, FIG. 1. A mirror 74 in FIG. 5 and a lens 76 in FIG. 6 individually form part of optics for the projection of images. The optical axis for projection is indicated by P in the respective figures. The selected slide 72a on the frame 70 is lightly engaged by yieldable means such as leaf springs as in the case of FIG. 2 so that it is movable outwardly in a direction x or y in a plane containing the slide 72a, which is perpendicular to the optical axis P. Although not shown in the drawings, the slide selector of the present invention, that is, accurate positioning means and the like such as those shown in FIG. 2 may be located in either the x-direction or the y-direction with respect to the frame 72 as the case may be. While in the arrangement of FIG. 1 the shaft 22a and optical axis 22b extend in parallel to each other, they are angled 90 degrees in the arrangement of FIG. 5 and somewhere between 0–90 degrees in the arrangement of FIG. 6. Optimal one of such angular arrangements may be selected to meet specific design requirements.

In summary, it will be seen that the present invention simplifies a rotation stop control mechanism because it eliminates the need for accuracy in starting and stopping the rotation of a disc which carries form slides thereon, in contrast to the prior art systems.

Also, the combination of a magnet on the slide mount and an electromagnet develops a force which holds a selected slide in a single possible stable position, thereby rendering the positioning mechanism simple in construction and accurate in operation.

Furthermore, so long as the slides conform to dimensional standards, any preparatory operation, such as loading a plurality of form slides on the disc as one set or replacing some of them with others, can be attained merely by mounting them on the disc without any special positioning. This speeds up such a preparatory operation and thereby remarkably enhances the operational efficiency of the slide selector.

Various modifications will become possible for those skilled in the art after receiving the teachings of the present disclosure without departing from the scope thereof. For example, the permanent magnet embedded in each slide mount may be replaced by a member made of a ferromagnetic material as typified by iron, cobalt, or nickel. The notches in one side of the slide mount may be substituted for by lugs and the lugs on the stop, by complementary notches. The notches and lugs may be omitted altogether if the positioning accuracy in the Y-direction is insignificant. Additionally, the T-shaped integral structure of the electromagnet and stop is by way of example only and a separate design or a configuration other than "T" may be employed instead, if an equivalent function is achievable.

What is claimed is:

1. A multi-form slide positioning apparatus for a multi-form slide recording system in which a specific one of a plurality of form slides individually received in form-slide housing sections of form-slide carrying means is selected and information recorded on the specific slide is projected from a projecting position by optics onto a recording medium, said positioning apparatus comprising:

form slide mount means for individually mounting the form slides, said form slide mount means being individually removably received in the housing sections of the form slide carrying means;

mount drive means for driving the form slide mount means, which has said selected form slide thereon, to move toward the projection position from the housing section associated therewith; and mount means positioning means for blocking the movement of the mount means to position said mount means at said projection position.

2. An apparatus as claimed in claim 1, further comprising support means for resiliently and detachably supporting the form slide mount means in the housing section.

3. An apparatus as claimed in claim 2, in which the support means comprises leaf spring means.

4. An apparatus as claimed in claim 1, in which the mount drive means comprises an attracting member for attracting the form slide mount means to the projection position, and an attracted member mounted on the mount means to be attracted by said attracting member.

5. An apparatus as claimed in claim 4, in which the attracting member comprises an electromagnet.

6. An apparatus as claimed in claim 5, in which the attracted member comprises a permanent magnet.

7. An apparatus as claimed in claim 5, in which the attracted member comprises a magnetic member.

8. An apparatus as claimed in claim 1, in which the mount means positioning means comprises mount stop means for stopping the movement of the mount means, and mount restraining means for restraining the stopped mount means at the projection position to hold the mount means thereat.

9. An apparatus as claimed in claim 8, in which the mount stop means comprises a flat member having a reference surface which is engageable with part of the form slide mount means.

10. An apparatus as claimed in claim 8, in which the mount restraining means comprises at least one first engaging member formed in part of the form slide mount means, and at least one second engaging member interengageable with the first engaging member when the mount means is in the projection position.

11. An apparatus as claimed in claim 10, in which the first engaging member is in the form of a notch, and the second engaging member is in the form of a lug which is interengageable with said notch.

12. An apparatus as claimed in claim 10, in which the first engaging member is in the form of a lug, and the second engaging member is in the form of a notch which is interengageable with said lug.

13. An apparatus as claimed in claim 8, further comprising means for moving the mount stop means in a selectable direction to adjust the projection position.

14. An apparatus as claimed in claim 1, in which the form slide carrying means comprises at least one rotatable disc, the form slide housing sections being arranged radially at predetermined spacings along the circumference of the rotatable disc.

15. An apparatus as claimed in claim 1, in which the form slide carrying means comprises a polygonal, hollow rotatable body having a plurality of side surfaces, the form slide housing sections being individually formed in said side surfaces.

16. In a COM system in which video information output from a central processing unit to appear on a display and video information recorded on specific one of multiple form slides are focused to a recording medium to be recorded thereon in a superposed image pattern, a multi-form slide selection apparatus for selecting specific one of the form slides, comprising:

optics for projecting video information recorded on said specific form slide to the recording medium;

form slide carrying means for carrying the form slides, and formed with form slide housing sections for individually housing the form slides;

drive means for driving the form slide carrying means to move the individual form slides;

control means for controlling said drive means to move the specific form slide to the vicinity of a projection position to be projected by the optics and stop said form slide thereat; and positioning means for restraining said specific form slide at said projection position, said positioning means comprising form slide mount means removably recieved in the form slide housing sections for individually mounting the form slides, mount drive means for driving the form slide mount means, which has said specific form slide thereon, to move toward said projection position from the housing section associated therewith, and mount means positioning means for blocking the movement of the mount means to position said mount means at the projection position.

* * * * *